US007079489B2

(12) United States Patent
Massie et al.

(10) Patent No.: US 7,079,489 B2
(45) Date of Patent: Jul. 18, 2006

(54) METHOD AND DEVICES FOR TRANSMITTING DATA WITH ACKNOWLEDGEMENT MECHANISM

(75) Inventors: Bastien Massie, Paris (FR); Catherine Leretaille, Paris (FR); Amine Lamani, Paris (FR); Wen Tong, Ottawa (CA); Mo-Han Fong, Ontario (CA)

(73) Assignee: Nortel Networks Limited, St. Laurent (CA)

( * ) Notice: Subject to any disclaimer, the term of this patent is extended or adjusted under 35 U.S.C. 154(b) by 918 days.

(21) Appl. No.: 10/046,527

(22) Filed: Jan. 14, 2002

(65) Prior Publication Data

US 2002/0154612 A1 Oct. 24, 2002

(30) Foreign Application Priority Data

Jan. 15, 2001 (FR) .................................. 01 00487

(51) Int. Cl.
*H04L 1/00* (2006.01)
*G06F 11/00* (2006.01)

(52) U.S. Cl. ..................... 370/236; 370/278; 714/703; 714/748

(58) Field of Classification Search ............... 714/750, 714/51, 48, 748, 703
See application file for complete search history.

(56) References Cited

U.S. PATENT DOCUMENTS 5,477,550 A * 12/1995 Crisler et al. ............... 714/748
5,483,545 A * 1/1996 Darmon et al. ............. 714/748
6,021,124 A * 2/2000 Haartsen .................... 370/336
6,289,003 B1 * 9/2001 Raitola et al. .............. 370/278
6,425,105 B1 * 7/2002 Piirainen et al. ............ 714/748
6,683,850 B1 * 1/2004 Dunning et al. ............ 370/231

FOREIGN PATENT DOCUMENTS

WO    WO 00 45543    8/2000
WO    WO 00 62467    10/2000

OTHER PUBLICATIONS

Technical Specification 3G TS 25.301, "Radio Interface Protocol Architecture", version 3.2.0, Publication of the 3rd Generation Partnership Project, Oct. 1999.

(Continued)

*Primary Examiner*—John Pezzlo
*Assistant Examiner*—Brian Roberts
(74) *Attorney, Agent, or Firm*—Trop, Pruner & Hu, P.C.

(57) ABSTRACT

A first unit successively transmits data blocks destined for a second unit. For at least some of the transmissions of blocks, the second unit returns an acknowledgement signal indicating whether the data block transmitted has been correctly received. The first unit transmits a redundancy block with regard to a block previously transmitted for which the acknowledgement signal received indicates incorrect reception. Each block transmitted is accompanied by an identification signal indicating whether it is a redundancy block. The first unit associates each acknowledgement signal received with a block transmitted in a temporal relation determined with the reception of this acknowledgement signal. In response to the reception of an identification signal inconsistent with an acknowledgement signal previously returned, the second unit returns to the first unit a restart command signal for the transmission of the blocks.

28 Claims, 11 Drawing Sheets

OTHER PUBLICATIONS

Technical Specification 3G TS 25.401, "UTRAN Overall Description", version 3.1.0, Publication of the 3rd Generation Partnership Project, Jan. 2000.

Technical Specification 3G TS 25.331, "RRC Protocol Specification", version 3.1.0, Publication of the 3rd Generation Partnership Project, Jan. 2000.

Technical Specification 3G TS 25.322, "RLC Protocol Specification", version 3.1.2, Publication of the 3rd Generation Partnership Project, Jan. 2000.

Technical Specification 3G TS 25.321, "MAC Protocol Specification", version 3.1.0, Publication of the 3rd Generation Partnership Project, Oct. 1999.

* cited by examiner

METHOD AND DEVICES FOR TRANSMITTING DATA WITH ACKNOWLEDGEMENT MECHANISM

BACKGROUND OF THE INVENTION

The present invention relates to techniques for data transmission using acknowledgement mechanisms within the framework of automatic repeat request (ARQ) procedures.

It applies in particular, but not exclusively, to the hybrid (HARQ) ARQ procedures provided for in certain mobile radio communication systems.

In these techniques, the data are sent in blocks, and the receiver unit returns acknowledgement signals to the transmitting unit indicating which blocks have been improperly received and/or properly received. The acknowledgement may be positive (the properly received blocks are signalled), negative (the blocks not received, or received with insufficient reliability, are signalled) or binary (for each block, the receiving unit returns a positive or negative acknowledgement). After having tagged an improperly received block, the transmitting unit can effect a repetition of this block so as to palliate its initial improper reception, or send redundancy information so as to increase the probability of detection of the data.

Here the term "block" should be understood to mean the data unit forming the subject of an acknowledgement. It should be noted that such a data block can be sent in the form of several separate packets, on different physical resources or at different instants on the same physical resource.

Usually, the blocks sent are numbered, the number being present in a block header. The acknowledgement then identifies by its number the block to which it pertains. The transmitting unit therefore unambiguously identifies the blocks which are to form the subject of repeats.

In certain cases, the sequence number is not available at the level of the module of the receiving unit which processes the acknowledgement mechanism. This may occur when the acknowledgement mechanism is implemented in low layers of the OSI model, in particular in the physical layer.

In such a case, the identification of the blocks acknowledged positively or negatively can result from a certain synchronism between the receiving and transmitting units. Given that the acknowledgement signal relating to a block will be received in a time span determined after the transmission of this block, the transmitting unit can effect the association allowing it to determine the repeats to be performed.

It may happen that a transmission error adversely affects the acknowledgement signal returned by the receiving unit with respect to a block. For example, if a negative acknowledgement returned by the receiving unit is interpreted as a positive acknowledgement by the transmitting unit, the latter transmits a new block when the receiving unit waits for a repeat of the block previously improperly received.

This type of error poses a difficulty in the HARQ procedures in which, when the receiving unit receives a block improperly, it combines this reception (insufficient by itself) with the reception of the repeated or redundant block. Reception diversity is thus obtained, increasing the probability of proper reception of the data. However, an ambiguity regarding the identity of a block sent (sending of a new block or repeat) then leads to false recombinations. These errors are liable to persist since the receiving unit continues to request the resending of the ambiguous block.

It should be noted that various types of repetition and of combination of the repeated blocks may be used (see for example, WO 00/62467):

1/ the improperly received block may be repeated in full. Even if the repeat is also received improperly, it may be that a combination of the two successive observations of the block will allow the receiving unit to detect the data sent;
2/ this combination may be performed on the "hard" values of the symbols received ("hard combining"), or on their "soft values", that is to say weighted by likelihood estimates ("soft combining");
3/ the repeated block may be sent by applying a channel coding scheme different from the first send, with or without modification of the coding rate, thereby affording diversity of coding which may improve the probability of detection under hard or soft combining;
4/ the repeat may pertain only to a part of the block or may simply transport "incremental redundancy". Such a redundancy block does not of itself allow the extraction of the data of the block initially sent, but it increases the probability of detection by a processing appropriate to the receiver.

To alleviate the difficulties related to possible improper reception of the acknowledgement signal, there may be provision for the transmitting unit to transmit with each block an indication regarding the type of this block, namely newly sent block or redundancy block subsequent to a negative acknowledgement.

When an acknowledgement signal is improperly received or improperly interpreted by the transmitting unit, this indication allows the receiving unit to be aware that a signalling error is involved. Nevertheless, an ambiguity regarding the nature of this error remains since the receiving unit cannot know whether the error has not occurred in the course of the sending of the block type indication. Given that the block accompanying the indication in accordance with which the receiving unit identifies an error is not the same depending on the direction of transmission in which this error is involved, the combining schemes, hard or soft, are also flawed.

An object of the present invention is to propose an acknowledgement and redundancy mechanism which limits the ambiguities regarding the identification of the blocks sent.

SUMMARY OF THE INVENTION

The invention thus proposes a method of transmitting data, wherein a first unit successively transmits data blocks destined for a second unit on a channel, and for at least some of the transmissions of blocks, the second unit returns an acknowledgement signal to the first unit, indicating whether the data block transmitted has been correctly received. The first unit transmits on said channel a redundancy block with regard to at least some of each block previously transmitted for which the acknowledgement signal received indicates incorrect reception, each block transmitted being accompanied by an identification signal indicating whether said block is a redundancy block. The first unit associates each acknowledgement signal received with a block transmitted in a temporal relation determined with the reception of said acknowledgement signal. In at least some of the cases of reception of an identification signal inconsistent with an acknowledgement signal previously returned, the second unit returns to the first unit a command signal for restarting the transmission of the blocks.

When the second (receiving) unit detects an inconsistency between an identification signal and an acknowledgement signal which it has previously returned, it signals it to the first (transmitting) unit, so that the sending of the blocks can restart on unambiguous bases.

Several modes of restart may be adopted.

In a first mode, one seeks to avoid any loss of block, so that the transmitting unit holds in memory any block which it has transmitted until the positive acknowledgement of the block is confirmed by the absence of reception of a restart command signal liable to cast doubt on this acknowledgement. In response to the reception of a restart command signal subsequent to the reception by the second unit of an identification signal inconsistent with the acknowledgement signal returned with regard to a first data block, the first unit then restarts the transmission of the successive blocks from said first data block.

In a second mode, one seeks rather to avoid delays in the sending of the sequence of blocks, by accepting that a few losses of block may occur. In response to the reception of a restart command signal subsequent to the reception by the second unit of an identification signal inconsistent with the acknowledgement signal returned with regard to a first data block, the first unit then restarts the transmission of the successive blocks from a data block following said first data block.

In an advantageous embodiment, the blocks are transmitted in turn over K subchannels, the first unit comprising K buffer memories wherein are temporarily recorded the data blocks respectively transmitted over the K subchannels, K being a number at least equal to 1 determined in such a way that the acknowledgement signal relating to a data block transmitted over one of the K subchannels is received before the transmission of the next block over said subchannel, said next block being a redundancy block with regard to said data block transmitted when the acknowledgement signal received indicates incorrect reception. When K=1, the ARQ procedure is of the "stop-and-wait" type. It is possible to take K=2 to increase the transmission throughput or K>2 if the propagation and processing delays are relatively large.

In the first mode of restart, the buffer memories may have a capacity of two data blocks. In the second mode, they may have a capacity of one block.

Another aspect of the present invention pertains to a device for transmitting data, comprising means for transmitting successive data blocks destined for a remote unit and means for receiving an acknowledgement signal returned by the remote unit and indicating whether a data block transmitted has been correctly received, the means for transmitting blocks being arranged so as to transmit a redundancy block with regard to at least some of each block previously transmitted for which the acknowledgement signal received indicates incorrect reception, each acknowledgement signal received being associated with a block transmitted in a temporal relation determined with the reception of said acknowledgement signal. The device furthermore comprises means for transmitting an identification signal accompanying each block transmitted and indicating whether said block is a redundancy block, the means for transmitting blocks being arranged so as to restart the transmission of the blocks in response to the reception of a restart command signal originating from the remote unit and indicating an inconsistency between an identification signal received and an acknowledgement signal previously returned by the remote unit.

A third aspect of the invention pertains to a device for receiving data in the form of data blocks successively transmitted by a remote unit on a channel, comprising means for receiving an identification signal accompanying each block transmitted and indicating whether said block transmitted is a redundancy block, and means for transmitting an acknowledgement signal returned to the remote unit and indicating whether a data block transmitted has been correctly received, a redundancy block being transmitted by the remote unit with regard to each block previously transmitted for which the acknowledgement signal received indicates incorrect reception. The receiving device furthermore comprises means for transmitting a restart command signal for the transmission of the blocks which is returned to the remote unit in at least some of the cases of reception of an identification signal inconsistent with an acknowledgement signal previously returned to the remote unit.

DESCRIPTION OF THE PREFERRED EMBODIMENTS

Figure 1:
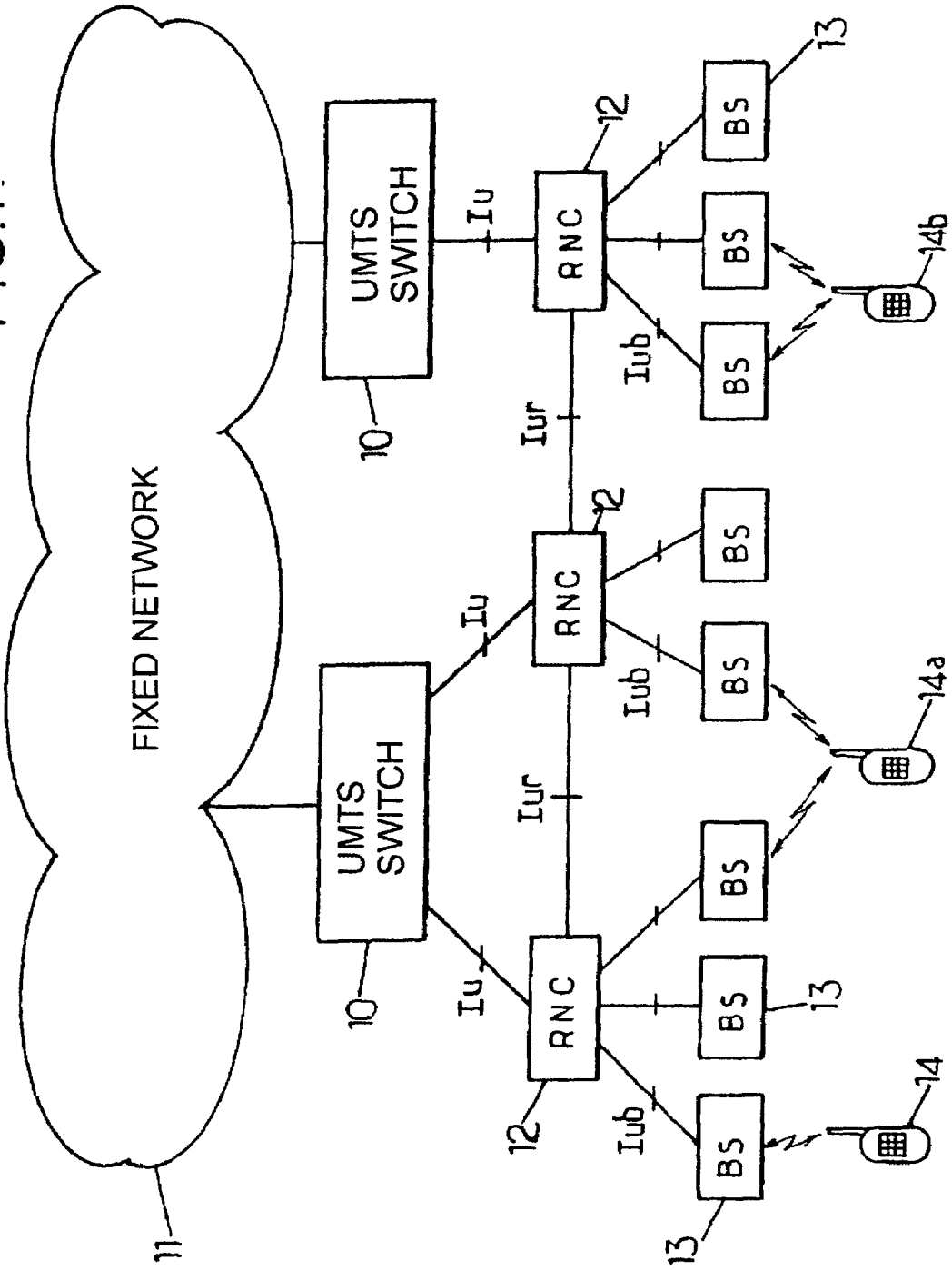
FIG. 1 is a diagram of a UMTS network to which the invention may be applied.

The invention is described below in its application to a UMTS network operating in FDD (frequency division duplex) mode. FIG. 1 shows the architecture of such a UMTS network.

The mobile service switches 10, belonging to a core network (CN), are linked on the one hand to one or more fixed networks 11 and on the other hand, by means of a so-called Iu interface, to control equipment 12 or RNCs ("Radio Network Controllers"). Each RNC 12 is linked to one or more base stations 13 by means of a so-called Iub interface. The base stations 13, distributed over the territory covered by the network, are capable of communicating by radio with the mobile terminals 14, 14a, 14b called UE ("UMTS Equipment"). The base stations can be grouped together to form nodes called "node B". Certain RNCs 12 may furthermore communicate with one another by means of a so-called Iur interface. The RNCs and the base stations form an access network called UTRAN ("UMTS Terrestrial Radio Access Network").

The UTRAN comprises elements of layers 1 and 2 of the OSI model with a view to providing the links required on the radio interface (called Uu), and a stage 15A for controlling the radio resources (RRC, "Radio Resource Control") belonging to layer 3, as is described in the 3G TS 25.301 technical specification "Radio Interface Protocol" version 3.2.0 published in October 1999 by the 3GPP ($3^{rd}$ Generation Partnership Project). As seen from of the higher layers, the UTRAN acts simply as a relay between the UE and the CN.

Figure 2:
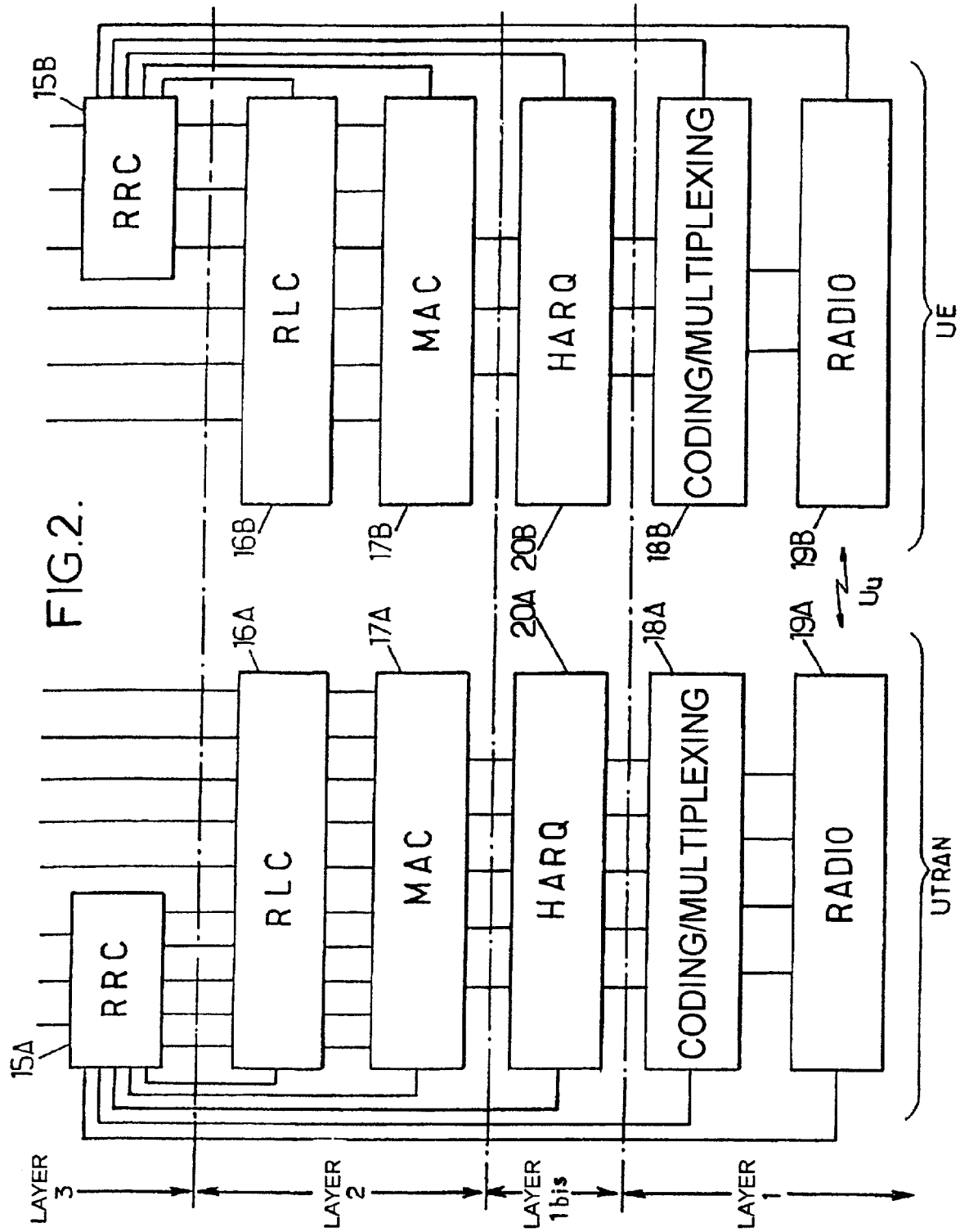
FIG. 2 is a chart showing the organization as layers of communication protocols employed on the radio interface of the UMTS network.

FIG. 2 shows the RRC stages 15A, 15B and the stages of the lower layers which belong to the UTRAN and to a UE.

On each side, layer 2 is subdivided into a radio link control (RLC) stage 16A, 16B and a medium access control (MAC) stage 17A, 17B. Layer 1 comprises a coding and multiplexing stage 18A, 18B. A radio stage 19A, 19B caters for the transmission of the radio signals from trains of symbols provided by the stage 18A, 18B, and the reception of the signals in the other direction.

Represented in the architecture of FIG. 2 is a layer 1 bis in which a procedure of HARQ type is implemented with regard to some of the transport channels. Considered below is the particular case, non-limiting, in which these channels subjected to the HARQ procedures are DSCH downlink shared channels useable within the framework of a service of HSDPA type ("High-Speed Data Packet Access"). The HARQ modules 20A, 20B of FIG. 2 may be seen as belonging to layer 1 or to layer 2 (in particular, they could form an extension of the MAC sublayer for the shared channels).

There are various ways of adapting the architecture of protocols according to FIG. 2 to the hardware architecture of the UTRAN according to FIG. 1, and in general various organizations can be adopted depending on the types of channels (see section 11.2 of the 3G TS 25.401 technical specification "UTRAN Overall Description", version 3.1.0 published in January 2000 by the 3GPP). The RRC, RLC and MAC stages are located in the RNC 12. When several RNCs are involved, the MAC sublayer can be proportioned among these RNCs, with appropriate protocols for the exchanges on the Iur interface, for example ATM ("Asynchronous Transfer Mode") and AAL2 ("ATM Adaptation Layer No. 2"). These same protocols may also be employed on the Iub interface for the exchanges between the MAC sublayer and layer 1. In the embodiment described here, the HARQ modules 20A are situated in the nodes B.

Layers 1, 1bis and 2 are each commanded by the RRC sublayer, whose characteristics are described in the 3G TS25.331 technical specification "RRC Protocol Specification", version 3.1.0 published in October 1999 by the 3GPP. The RRC stage 15A, 15B supervises the radio interface. Moreover, it processes streams to be transmitted to the remote station according to a "command plan", as opposed to the "user plan" which corresponds to the processing of the user data arising from layer 3.

The RLC sublayer is described in the 3G TS 25.322 technical specification "RLC Protocol Specification", version 3.1.2 published in October 1999 by the 3GPP. In the transmit direction, the RLC stage 16A, 16B receives, according to the respective logical channels, data streams consisting of service data units (RLC-SDU) arising from layer 3. An RLC module of the stage 16A, 16B is associated with each logical channel so as in particular to perform a segmentation of the RLC-SDU units of the stream into protocol data units (RLC-PDU) addressed to the MAC sublayer and comprising an optional RLC header. In the receive direction, an RLC module conversely performs a reassembling of the RLC-SDU units of the logical channel from the data units received from the MAC sublayer.

Depending on the logical channels and under the command of the RRC stage, the RLC sublayer can render a service of transfer in transparent mode, in acknowledged mode or in non-acknowledged mode. In transparent mode, the RLC sublayer sends protocol data units (PDUs) of the higher layers without adding information, possibly with a segmentation and reassembly function. In the non-transparent modes, an RLC header comprising a sequence number is added to the data sent. An acknowledgement mechanism based on the sequence numbers placed in the RLC headers is provided in acknowledged mode.

The MAC sublayer is described in the 3G TS 25.321 technical specification "MAC Protocol Specification", version 3.1.0 published in October 1999 by the 3GPP. It maps one or more logical channels onto one or more transport channels TrCH. In the transmit direction, the MAC stage 17A, 17B can multiplex one or more logical channels in one and the same transport channel. On such a transport channel, the MAC stage 17A, 17B delivers successive transport blocks TrBk each consisting of an optional MAC header and an RLC-PDU unit arising from an associated logical channel.

For each TrCH, the RRC sublayer provides the MAC sublayer with a set of transport formats (TFS, "Transport Format Set"). A transport format comprises a transmission time interval TTI equal to 10, 20, 40 or 80 ms, a transport block size, a transport block set size and parameters defining the protection scheme to be applied in the TrCH by layer 1 for detecting and correcting transmission errors. Depending on the current bit rate on the logical channel or channels associated with the TrCH, the MAC stage 17A, 17B selects a transport format from the TFS assigned by the RRC sublayer, and it delivers in each TTI a set of transport blocks complying with the selected format, whilst indicating this format to layer 1.

Layer 1 can multiplex several TrCHs on a given physical channel. In this case, the RRC sublayer assigns a set of combinations of transport formats (TFCS, "Transport Format Combination Set") to the physical channel, and the MAC sublayer dynamically selects a combination of transport formats from this TFCS set, thereby defining the transport formats to be used in the various multiplexed TrCHs.

These transport formats define in particular the channel coding to be applied for the modules 18A, 18B so as to detect and/or correct the transmission errors.

The channel coding mechanism used comprises in particular the adding of a cyclic redundancy code (CRC) to the transport blocks so as to detect errors in their transmission. This detection can also result from the error correcting decoder using turbo codes or convolutional codes. The module 18A, 18B of the receiving unit can thus identify blocks received incorrectly and inform the higher layers of this.

UMTS uses the spread spectrum CDMA technique, that is to say the symbols transmitted are multiplied by spreading codes consisting of samples called "chips" whose rate (3.84 Mchip/s in the case of UMTS) is greater than that of the symbols transmitted. The spreading codes distinguish various physical channels PhCH which are superimposed on the same transmission resource consisting of a carrier frequency. The auto- and cross-correlation properties of the spreading codes enable the receiver to separate the PhCHs and to extract the symbols intended therefor. For UMTS in FDD mode on the downlink, a scrambling code is allocated to each base unit, and various physical channels used by this base station are distinguished by mutually orthogonal channel codes (channelization codes). The base station can also use several mutually orthogonal scrambling codes. On the uplink, the base station uses the scrambling code to separate the transmitting UEs, and possibly the channel code to separate the physical channels arising from one and the same UE. For each PhCH, the overall spreading code is the product of the channel code and the scrambling code. The spreading factor (equal to the ratio of the chip rate to the symbol rate) is a power of 2 lying between 4 and 512. This factor is chosen as a function of the bit rate of symbols to be transmitted on the PhCH. The various physical channels are organized in 10 ms frames which follow one another on the carrier frequency used by the base station. Each frame is subdivided into 15 time slots of 666 μs. Each slot can carry the superimposed contributions of one or more physical channels, comprising common channels and DPCH ("Dedicated Physical CHannel") dedicated channels. The contribution from a DPCH to a time slot in FDD mode comprises:

a certain number of pilot symbols. Known a priori to the recipient, these symbols allow the recipient to acquire synchronization and to estimate parameters which are useful for demodulating the signal;

a transport format combination indicator TFCI; this TFCI arises from the MAC and/or HARQ sublayer;

a transmit power control TPC to be used by the way recipient on the reverse link; this command arises from a layer 1 power control module which uses slaving parameters arising from the RRC sublayer;

one or more data fields.

The DPCH can thus be viewed as aligning a physical channel dedicated for control, or DPCCH ("Dedicated Physical Control CHannel"), corresponding to the TFCI, TPC and PL fields, and a physical channel dedicated for the data, or DPDCH ("Dedicated Physical Data CHannel"), corresponding to the data fields.

The shared channels of DSCH type only exist in the downlink direction. A DSCH is a transport channel shared dynamically among several UEs. Layer 1 maps it onto one or more physical channels (PhCH), without applying macrodiversity (the DSCH is therefore sent only in one cell).

In FDD mode, the DSCH is defined as an extension of a dedicated transport channel (DCH). The allocation of the resources relating to the DSCH is signalled to each UE concerned by using the TFCI sent on the DPCCH of the dedicated channel. The TFCI thus carries the information according to which a given code of the DSCH must be listened to by the UE. As a variant, the information sent on the downlink DCH can specify that the UE must listen to the DSCH in a certain period and decode the addressing data contained in the blocks.

The HARQ procedure applied to the DSCH also requires exchanges of signalling between the node B and the UE. The DPCCHs of the dedicated uplink and downlink channels can be used to send this signalling information, especially by means of a particular coding of the states of the TFCI (provision may also be made for a specific field separate from the TFCI field).

Figure 3:
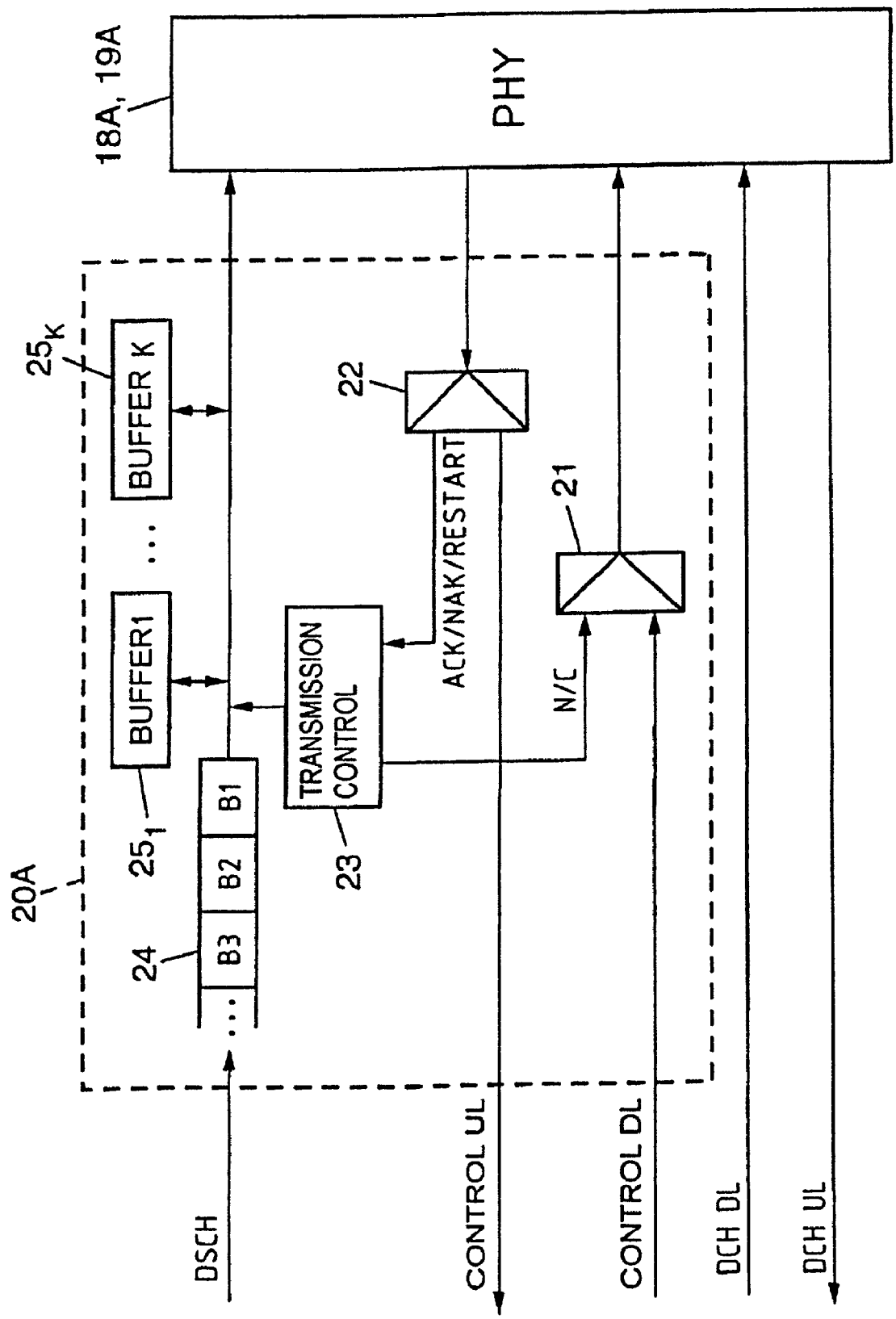
FIGS. 3 and 4 are schematic diagrams describing facilities of a base station and of a UMTS mobile station which are adapted to the implementation of the invention.

FIG. 3 shows a possible organization of the HARQ module 20A of node B, situated between the MAC sublayer 17A and the physical layer 18A, 19A. The uplink (UL) DCH and downlink (DL) DCH are active at the same time as the DSCH to which the HARQ procedure is applied. The figure also shows uplink (UL) and downlink (DL) control information exchanged by way of the DPCCHs. This control information is processed partly in the HARQ module by a coding/decoding of the TFCI field.

In the downlink direction, the HARQ module 20A modifies the coding of the TFCI received from the MAC sublayer 17A, as illustrated by the multiplexer 21, so as to supply an N/C ("New/Continue") binary indication which echoes the acknowledgement signals received. The states of the TFCI sent on the downlink DPCCH thus make it possible to identify whether the corresponding block sent on the DSCH is a new data block (N) or a redundancy block (C).

In the uplink direction, the coding of the TFCI by the UE determines an uplink indication which can take three states:

ACK, for a positive acknowledgement of a block;

NAK for a negative acknowledgement;

RESTART for commanding a restart of the transmission of the blocks.

A decoding of this uplink TFCI, shown diagrammatically by the demultiplexer 22, makes it possible to extract this indication from the HARQ module 20A of node B.

In the node B, the N/C signal is produced and the ACK/NAK/RESTART signal is processed by a control module 23 which manages the transmission of the data blocks arising from the RLC/MAC layer. These blocks (TrBk) are placed in a transmission queue 24 as and when they are delivered by layer 2.

For the transmission of these blocks, node B uses K subchannels (K≧1). For each subchannel i, the module 20A comprises a buffer memory $25_i$ where the blocks sent are stored temporarily. In practice, the queue 24 and the K buffer memories $25_1$, $25_2$, . . . may be embodied with a single memory component in which the addresses are managed by the module 23 so that a block is assigned logically either to the queue 24 or to one of the buffer memories $25_i$.

The blocks are transferred successively from the queue 24 to the physical layer. Transmission is distributed in turn between the K subchannels (which are not distinguished in the physical layer). Each block forming the subject of a transmission on a subchannel i is recorded in the corresponding buffer memory $25_i$ so as to be able to be retransmitted on the same subchannel should a NAK signal relating to it be received.

Given that the HARQ layer does not have access to the RLC headers of the blocks, the module 20A has no numbering information for these blocks. The assigning of an ACK/NAK signal to a block previously transmitted stems from the instant of reception of this ACK/NAK signal.

By way of example, the case where K=2 may be considered. The downlink transmission on the DSCH channel is effected according to an alternation of two types of periods, one for the transmission of blocks on subchannel 1, and the other for the transmission of blocks on subchannel 2. These periods have a duration (for example a few tens of milliseconds) such that the acknowledgement signal for a block sent on one of the subchannels is received and interpreted by the node B before the start of the next period allotted to this subchannel, that is to say in the course of the following period allotted to the other subchannel. If this condition cannot be complied with in view of the propagation times within the cell and of the processing times for the blocks and signalling information, it is possible either to increase the duration of these periods, or to increase the number K.

The transmission control module 23 processes the acknowledgement signals ACK/NAK received from the UE and controls accordingly the transferring of the blocks to the physical layer from the memory 24, $25_1$, $25_2$, . . . . It thus fixes the N/C indication taken into account in the coding of the TFCI sent.

Figure 4:
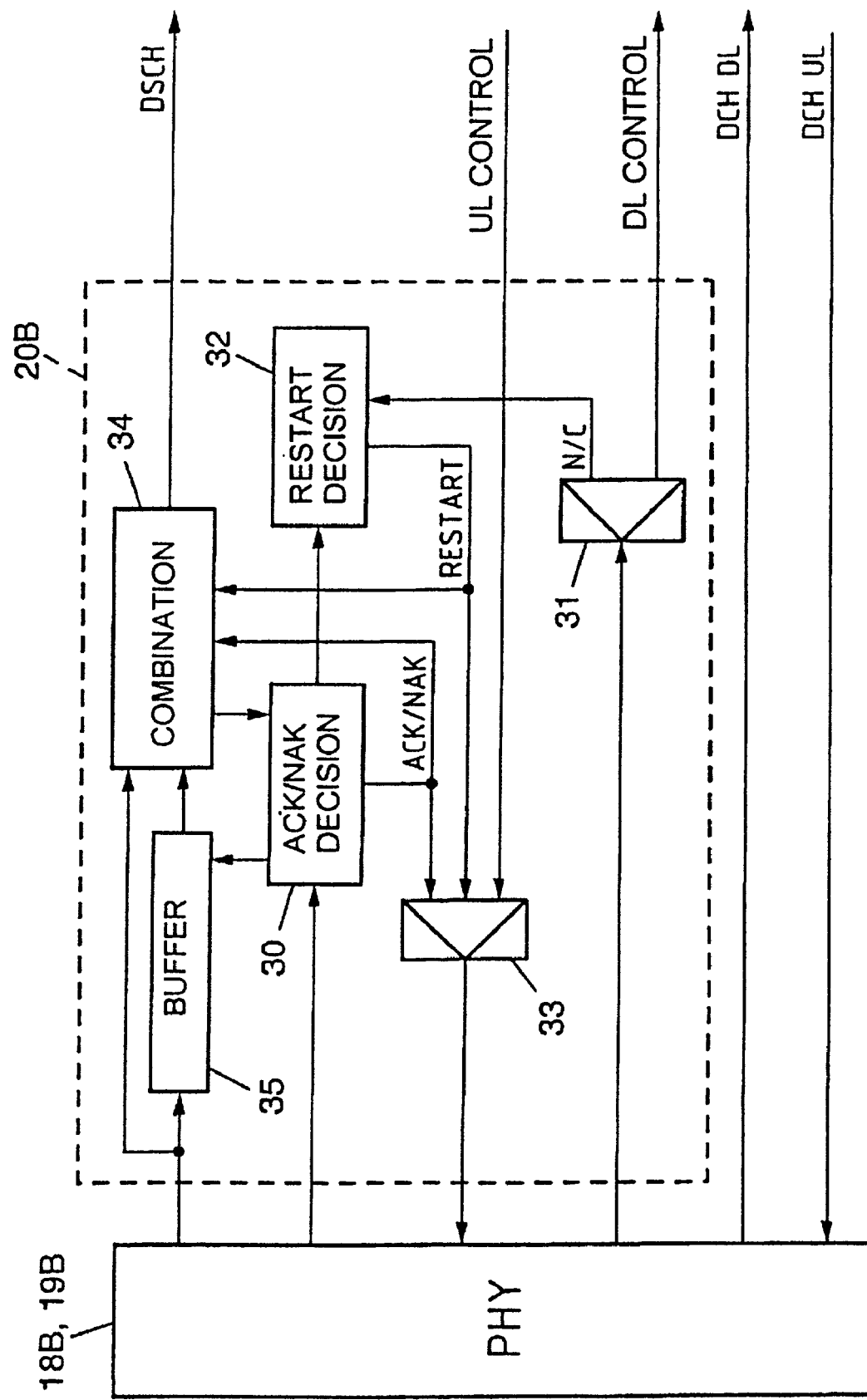

The HARQ module 20B of the UE is shown diagrammatically in FIG. 4. The positive or negative acknowledgement of a data block received is decided by a module 30 as a function of the success or of the failure of the decoding by the physical layer. The latter supplies for example a binary signal for each block, indicating whether it has been correctly received in accordance with the channel decoding and the CRC decoding operated in the stage 18B.

The ACK/NAK decisions taken successively, as well as the N/C signals received successively by decoding the downlink TFCI (shown diagrammatically by the demultiplexer 31) are supplied to a module 32 which decides whether or not to assign the RESTART state to the uplink indication returned by means of the coding of the TFCI (shown diagrammatically by the multiplexer 33). The module 32 consists essentially of an automaton which goes to the RESTART state when it receives, with a block sent on one of the subchannels, an N/C signal inconsistent with the ACK/NAK acknowledgement signal which has been returned with regard to the previous block received on the same subchannel.

The decisions taken by the modules 30 and 32 are supplied to a module 34 which effects, as the case may be, the combining of the successive sendings of the same block.

As long as the negative acknowledgement has not been returned, the module 34 simply sends the MAC sublayer 17B the transport block arising from the physical layer 18B, 19B. When a negative acknowledgement (NAK) is decided, the corresponding block is recorded in a buffer memory 35, in the form of soft or hard symbol values. During the next reception on the same subchannel, this block is read from the memory 35 and combined with the block received by the module 34 so as to reattempt to extract the data so as to communicate them to the MAC layer. If this attempt fails, a new negative acknowledgement is returned and the repeat of the block can also be recorded in the buffer memory 35.

When the automaton 32 goes to the RESTART state with regard to one of the subchannels, the buffer memory 35 is purged as far as any blocks stored in respect of this subchannel are concerned, and the next block received on this subchannel will be processed by the module 34 as if the previous block had been acknowledged positively.

In the charts of FIGS. 5 to 8, it has been considered that K=2 and that each of the K buffer memories of the module 20A has a capacity of just one transport block.

These figures illustrate the sending of a sequence of six blocks B1–B6. The upper part of the charts shows the content of the transmission queue 24 just before the transmission of the current block. Underneath can be seen the content of the buffer memory $25_1$ or $25_2$ of the current subchannel just after the transmission of this block. The line "node B Tx" illustrates the transmission of the current block from the node B, the N/C indication sent in parallel on the downlink DPCCH being shown in brackets (this line shows the alternation of the periods relating to the two subchannels, it being noted that the sending of the block can occur at any moment, in one go in or several goes, inside each period as a function of the signalling information sent on the dedicated downlink channel). The line "UE Rx" shows the blocks received by the UE as well as the N/C indications received concomitantly. The line "UE Tx" shows the ACK/NAK/RESTART indications returned by the UE on the uplink DPCCH. The line "node B Rx" shows the reception of these indications by the node B. The propagation times on the downlink and uplink are respectively denoted $\tau_{PGD}$ and $\tau_{PGU}$. The maximum processing time for a block received by the UE is denoted $\tau_{PCU}$. The maximum processing time for the uplink indication ACK/NAK/RESTART by the node B is denoted $\tau_{PCN}$.

On each chart, the arrow F represents an error of transmission or of interpretation of one of the indications of the HARQ procedure which are transmitted on the DPCCHs, and the arrow F' represents an inconsistency detected by the module 32 of the UE between an N/C indication received on the downlink DPCCH and an ACK/NAK signal previously returned.

Figure 5:
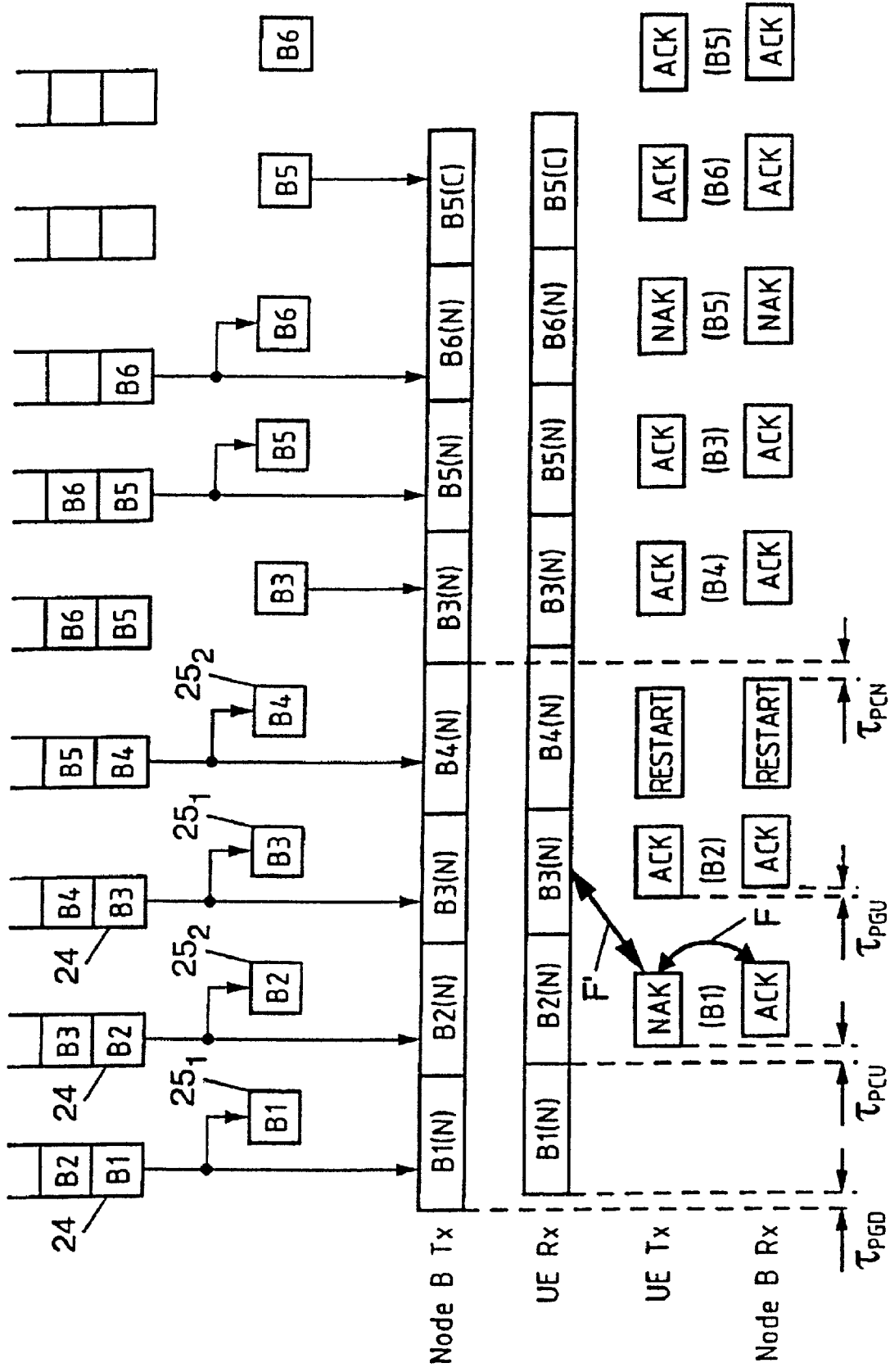
FIGS. 5 to 8 are timecharts showing the exchanges of blocks and of signals in various error cases in a first embodiment of the invention.

In the example of FIG. 5, the block B1 is improperly received by the UE which returns a negative acknowledgement which the node B interprets in error as a positive acknowledgement. The next block B3 sent on the subchannel is then accompanied by the indication N. After having noted the inconsistency, the UE returns a RESTART indication so that, in the next period relating to subchannel 1, the node B resends the code B3 accompanied by the indication N (and not C). It should be noted that if the uplink indication had been set to the NAK state instead of RESTART, the UE would have continued to wait for a redundancy block corresponding to B1, which would not have been despatched by the node B. By virtue of the RESTART indication, subchannel 1 is prevented from being blocked in this way until the expiry of the retransmit time outs or until a maximum number of resends is reached. An appreciable gain in terms of capacity and transmission delay is therefore obtained.

Figure 6:
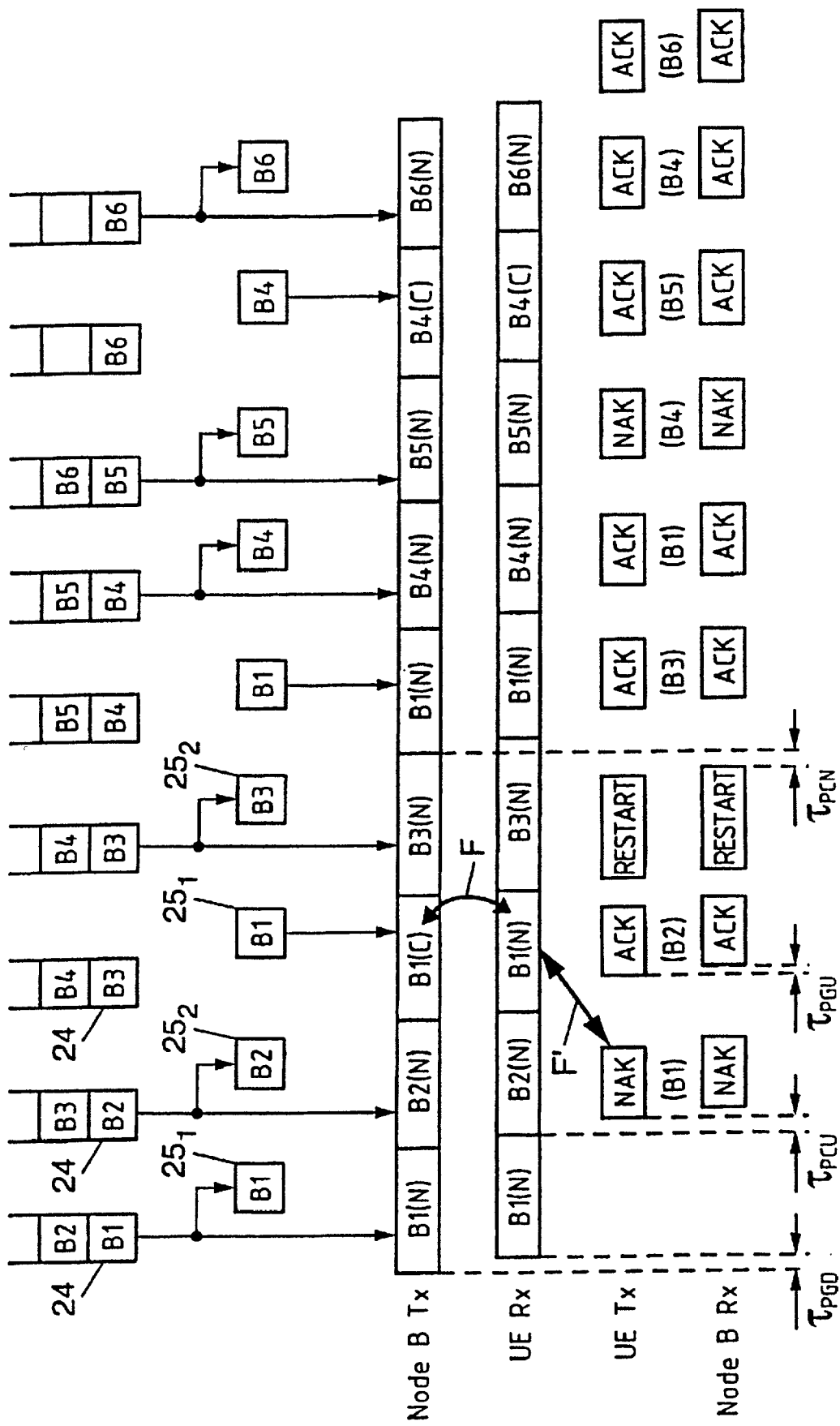

In the example of FIG. 6, the negative acknowledgement returned by the UE is correctly interpreted by the node B, but it is the redundancy indication (C) accompanying the repeat of the block B1 which is interpreted erroneously by the UE as an indication of new send (N). In this case, the block B1 is still present in the buffer memory $25_1$ when the node B receives the RESTART indication. It is noted that all the blocks may then be correctly received by the UE.

When the UE notes an inconsistency after having returned a negative acknowledgement, it cannot know whether the error configuration is that of FIG. 5 or that of FIG. 6, that is to say whether it is receiving block B1 or block B3, so that the combining module 34 cannot operate satisfactorily. Consequently, the UE drops the reception of the current block and sends back the RESTART indication so that the transmission of the blocks restarts on consistent bases.

Figure 7:
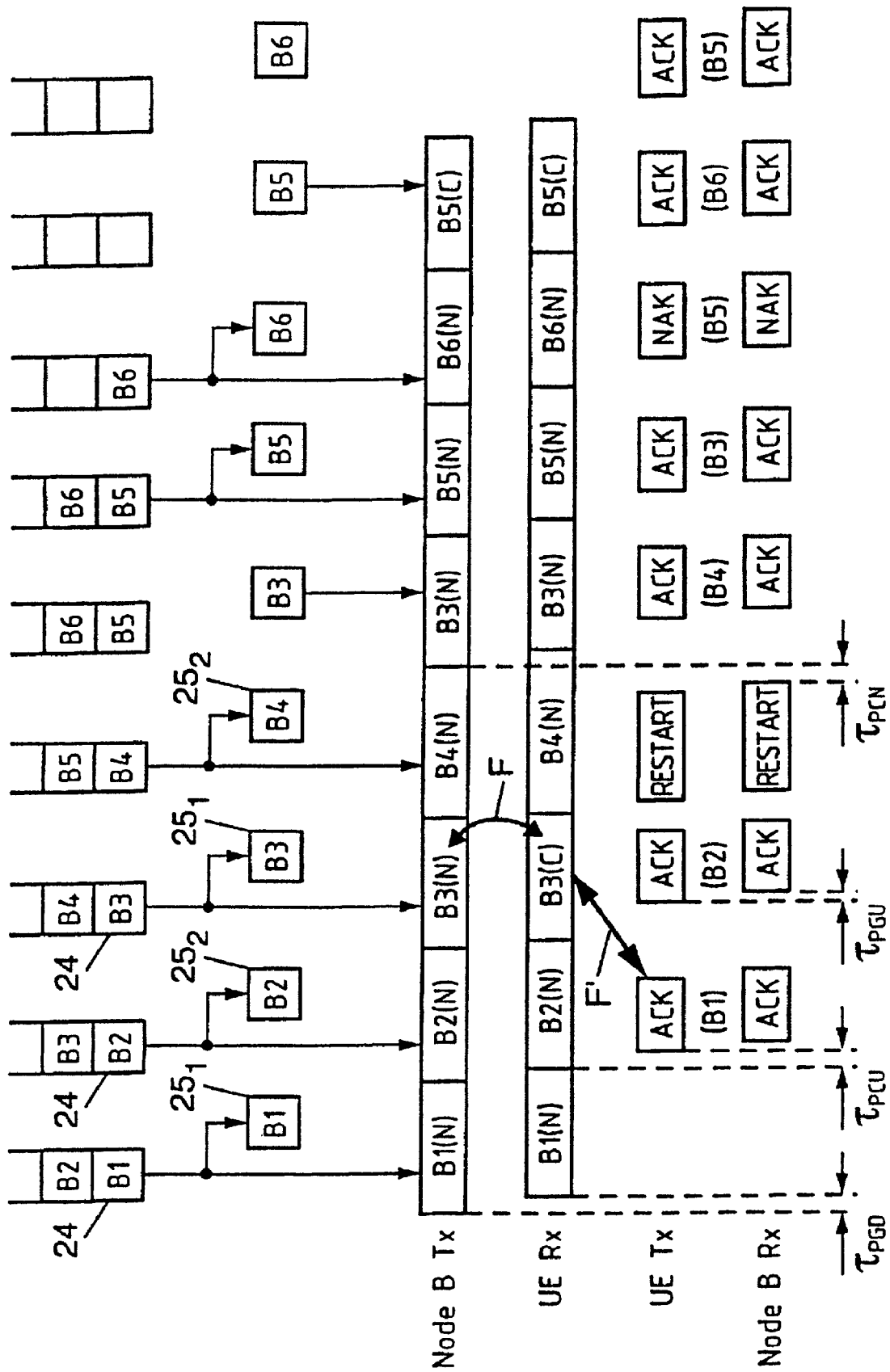
Figure 8:
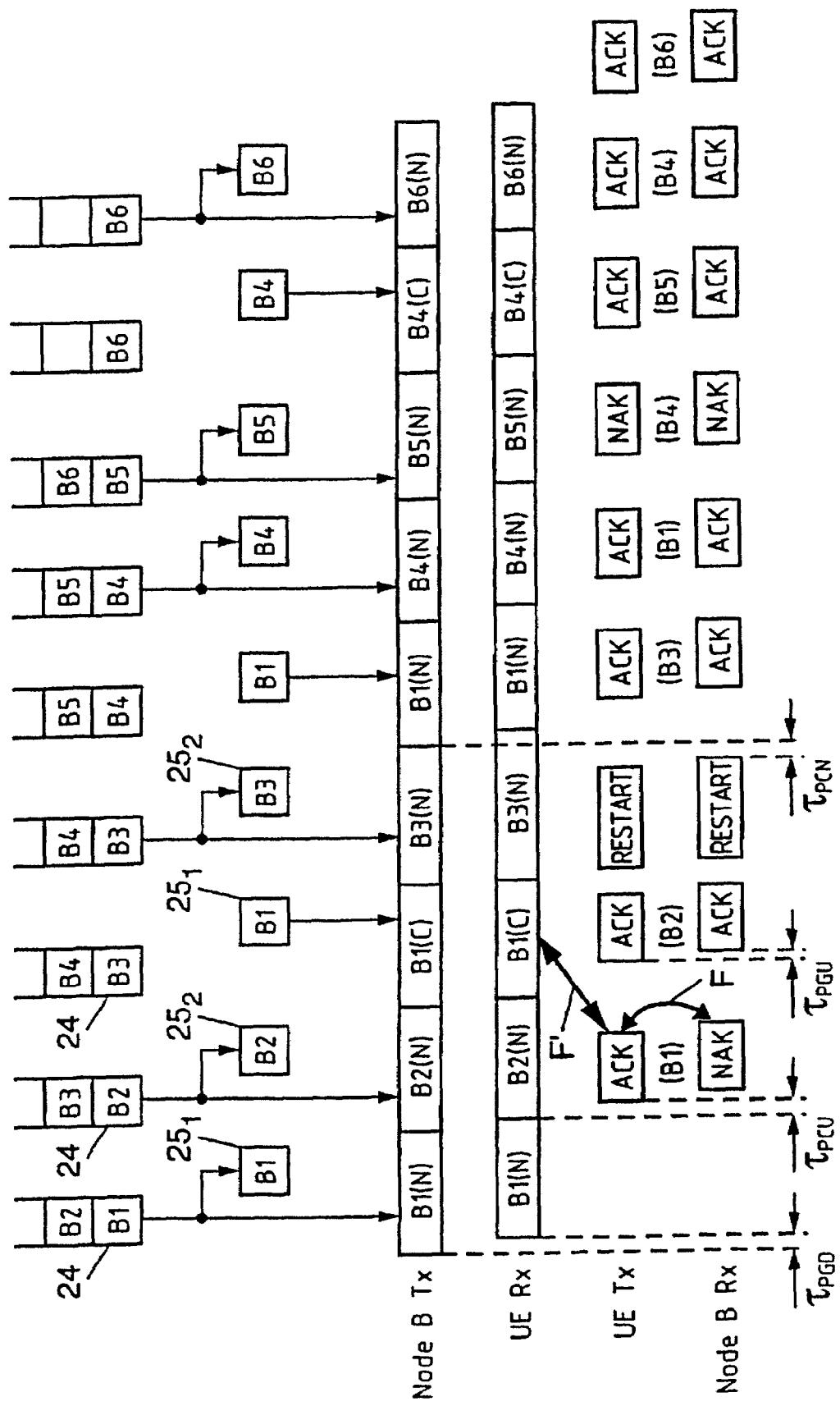

In the error configurations of FIGS. 7 and 8, the inconsistency F' is observed by the UE after it has returned a positive acknowledgement ACK. The error occurs on the downlink DPCCH in the case of FIG. 7 and on the uplink DPCCH in the case of FIG. 8.

FIGS. 5 to 8 illustrate the four cases of simple error regarding the indications of the HARQ procedure which are sent on the DPCCH channels (the probability of a double error is much smaller). An advantage of this embodiment is that the HARQ procedure introduces a very small delay when such an error occurs. It may be seen that the reception of the block B1 is missed by the UE in one case out of four (that of FIG. 5). This is not necessarily much of an impediment since a palliative or an acknowledgement mechanism based on the sequence number is generally implemented in the RLC layer.

Figure 9:
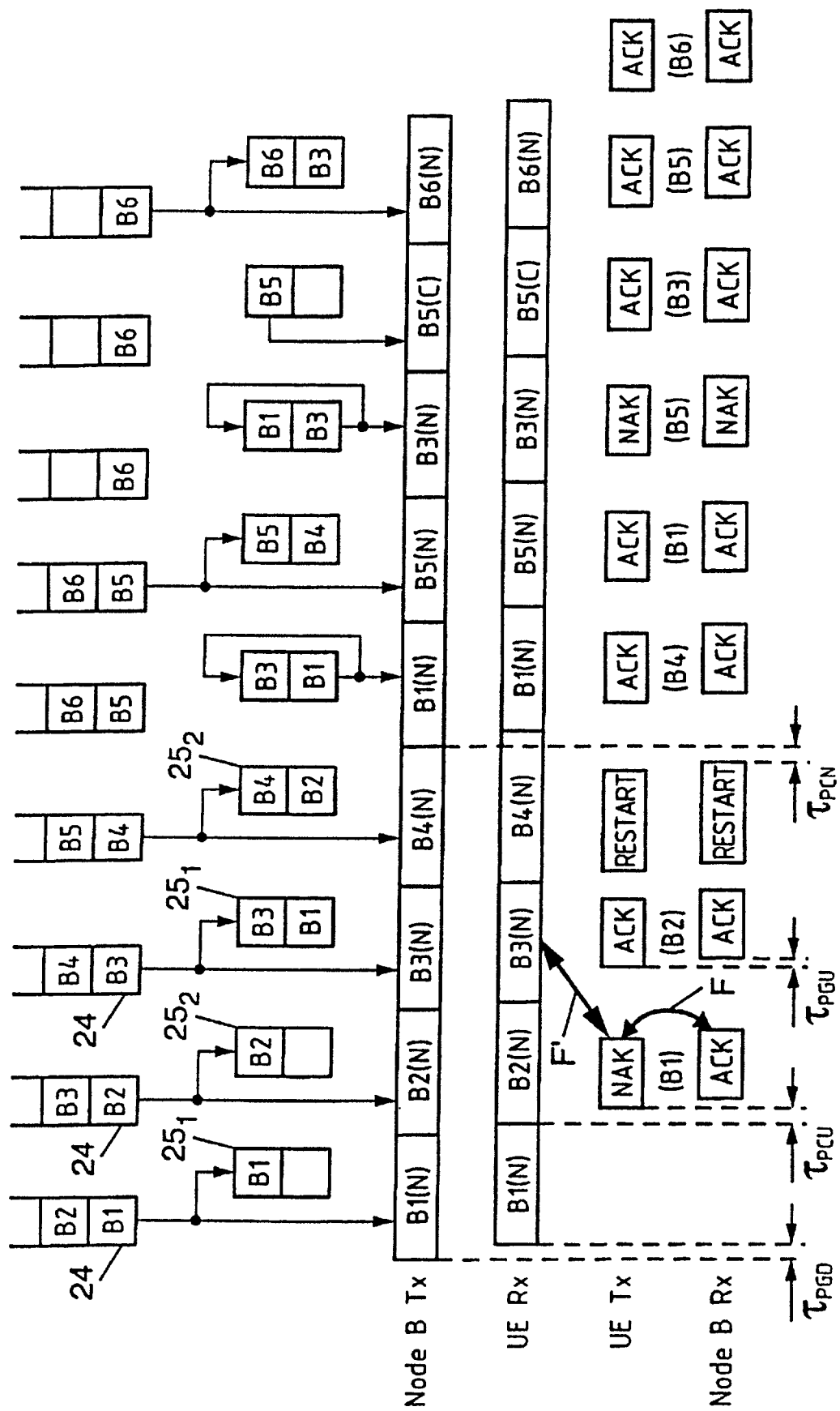
FIGS. 9 to 11 are timecharts showing the blocks of the signals exchanged in an error case in three embodiments of the invention.
Figure 10:
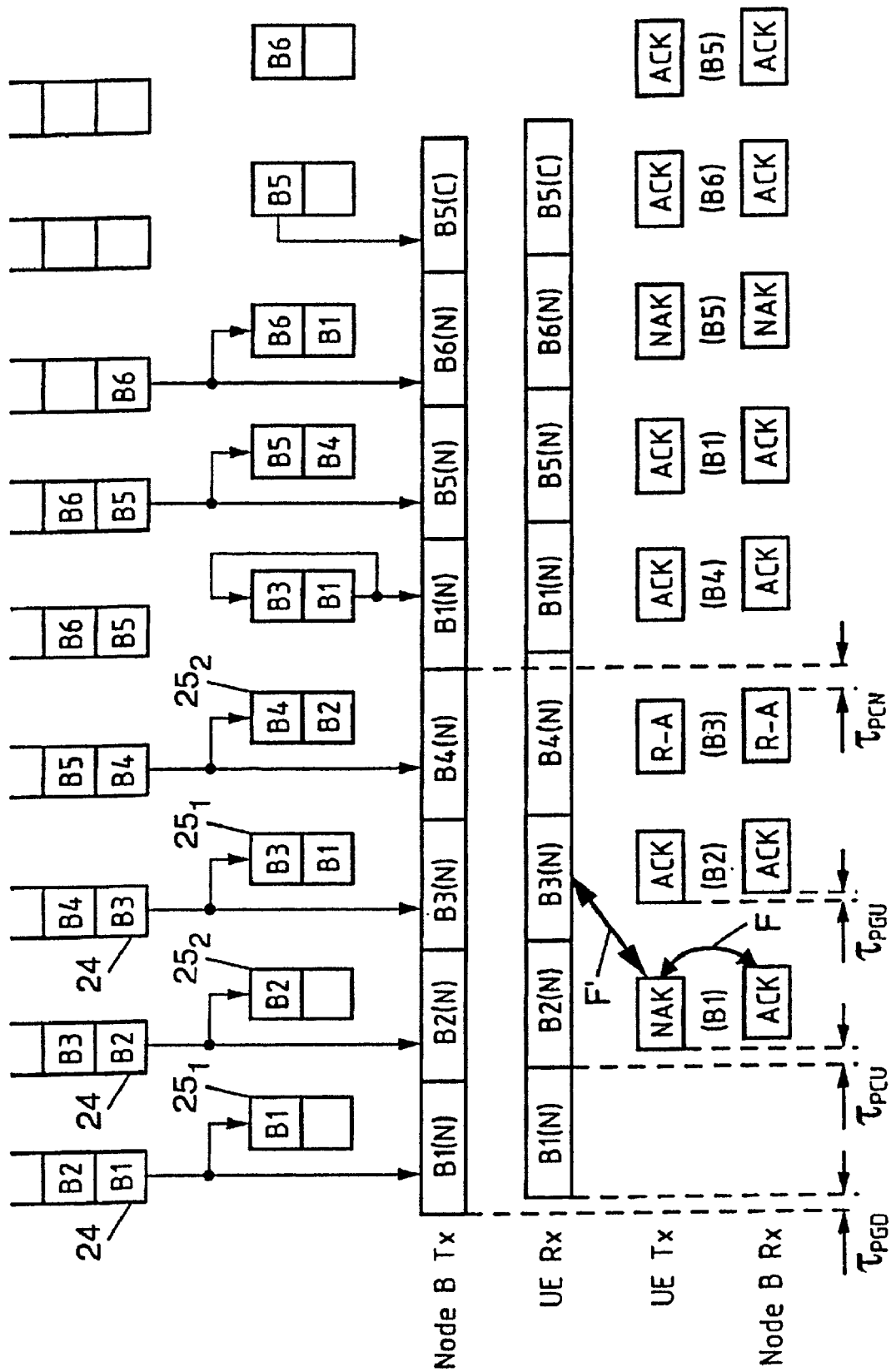
Figure 11:
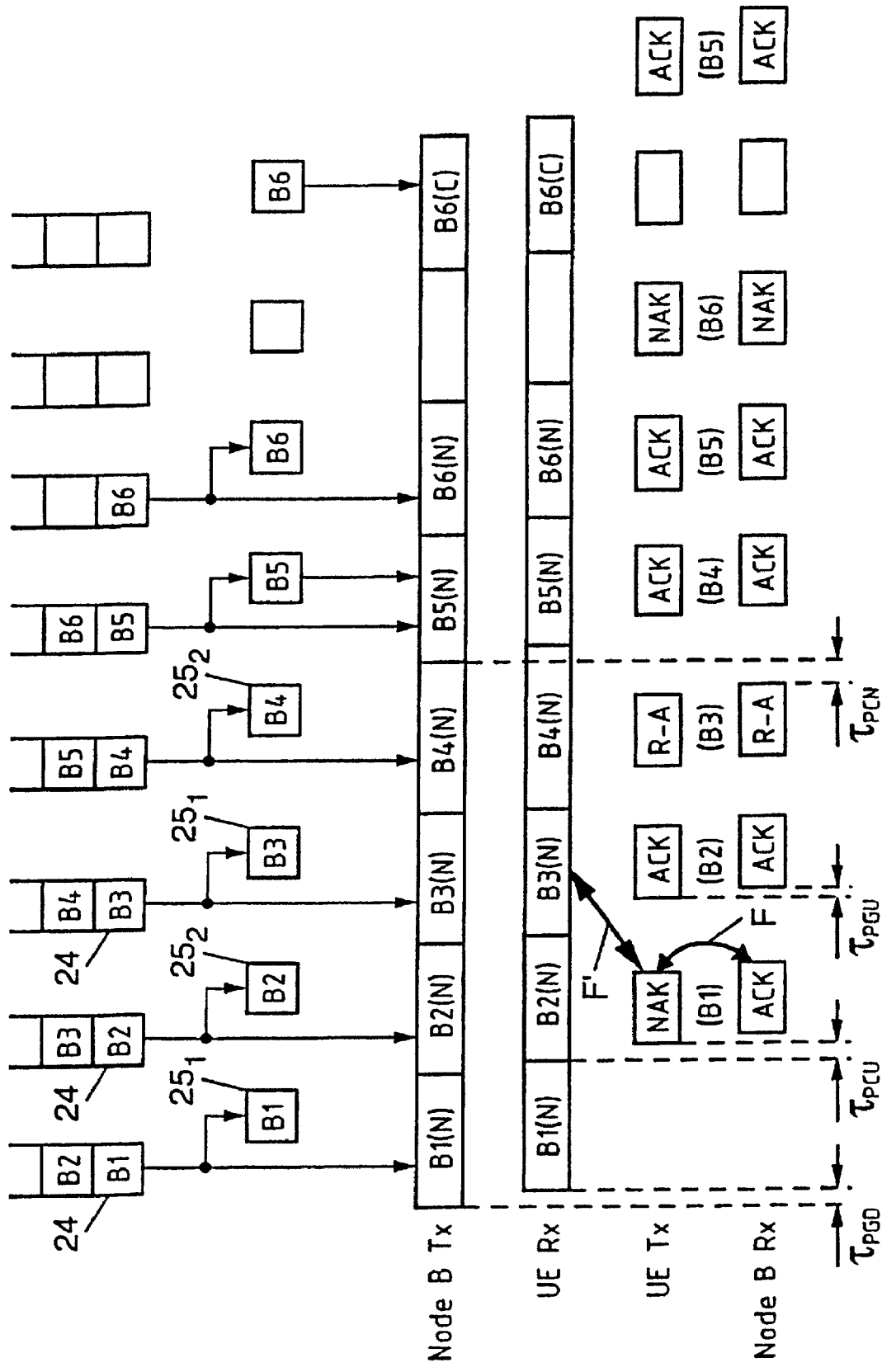

FIGS. 9 to 11 are similar charts, corresponding to the error case illustrated by FIG. 5.

In the embodiments of FIGS. 9 and 10, each buffer memory $25_1$, $25_2$ of the HARQ module 20A of node B stores the two most recent data blocks of the subchannel.

In the case of FIG. 9, the behaviour of the UE is the same as in the exemplary embodiment illustrated by FIGS. 5 to 8. On receiving the RESTART indication for one of the subchannels (subchannel 1 in the example), the node B does not repeat the last block sent on this subchannel (B3) but rather the previous block (B1). This block is the one in respect of which it is not certain that it has been correctly received by the UE. Specifically, for this block the UE has returned an ACK/NAK acknowledgement signal whose N/C echo as interpreted by the UE has revealed an inconsistency.

The mode of restart according to FIG. 9 therefore makes it possible to guarantee proper reception of each of the blocks.

In this embodiment, it is noted that the node B must re-transmit each of the blocks B1 and B3 with the indication N after having received the RESTART indication. Consequently, the total sending time is greater than that of the similar error configuration in the embodiment of FIG. 5.

It may however happen that the block received accompanied by an N/C indication revealing an inconsistency F' may be correctly decoded by the physical layer 18B of the UE. It can therefore be envisaged that the UE may acknowledge this block positively at the same time as it returns the RESTART indication.

Such an embodiment is illustrated by FIG. 10. In this embodiment, the UE also decodes the blocks received with an N/C indication revealing an inconsistency. The uplink indication coded in the TFCI can then take four states:

ACK for a positive acknowledgement without restart command;
NAK for a negative acknowledgement without restart command;
R-A for a positive acknowledgement with restart command;
R-N for a negative acknowledgement with restart command;

The ACK or NAK state is decided under the same circumstances as before. The R-A state corresponds to RESTART when the receiver has been able to decode the block accompanied by the N/C indication revealing an inconsistency. This correct decoding can result from the physical layer 18B alone or from the physical layer supplemented by the HARQ layer combining module 34. The R-N state corresponds to RESTART when the receiver has been incapable of decoding the block accompanied by the N/C indication revealing an inconsistency.

In response to the R-N state decoded in the uplink TFCI, the node B operates in the same way as in the case of receiving the RESTART signal in the previous embodiments. In response to the R-A state, as shown in FIG. 10, the node B restarts with a new send (N) of the block whose proper reception by the UE is not ensured, but the block which followed (transmitted with the N/C indication whose reception revealed the inconsistency) is not resent, except in the case where a second RESTART indication (R-A or R-N) is received very soon afterwards for the same subchannel. To do this, the module 23 reads the first block (B1) from the buffer memory $25_1$ so as to have it transmitted by the physical layer with the indication N then, in the subsequent next period of the subchannel, it instructs the transmission:
(i) of the same block (B1, C), read from the buffer memory $25_1$, should a NAK be received;
(ii) of the block (B3, N) which accompanied the N/C indication whose reception revealed the first inconsistency, which block was read at the other location of the buffer memory $25_1$, should an R-A or an R-N be received;
(iii) of the next block (B6, N) of the queue 24 should an ACK be received (the case of FIG. 10).

By comparing FIGS. 9 and 10, it may be seen that the distinguishing of the positive and negative acknowledgements in the presence of a RESTART allows a time saving in the sending of the blocks, without losing the guarantee of reception by the UE. However, this requires that sufficient states of coding of the uplink TFCI be available to take into account an additional state of the HARQ indication.

In the embodiment illustrated by FIG. 11, the UE behaves as in the case of FIG. 10. It decodes the blocks received with an N/C indication revealing an inconsistency, so as to positively acknowledge those which are correctly received. However, each buffer memory $25_1$, $25_2$ of the node B is configured to store just one block at a time, as in the case of FIGS. 5 to 8. The first block (B1) being no longer available in the buffer memory $25_1$ so as to be retransmitted after reception of the R-A, the latter state brings about a response of the node B identical to the response to an ACK. Consequently, the UE can return an ACK in place of the R-A, and they are reduced to three states of coding of the uplink HARQ indication.

Such an embodiment according to FIG. 11 does not require any additional bandwidth nor any additional complexity as compared with the embodiment of FIG. 5. It may be seen that it makes it possible to send the sequence of blocks in a smaller number of periods. The behaviour of the node B, and the possible loss of blocks are the same in both cases. The RESTART (R-N) indication is resurrected by the UE when two conditions are fulfilled: noting of an inconsistency F' and incorrect or insufficient decoding of the concomitant block.

The previous discussion shows that certain parameters related to the determination and to the processing of the RESTART signals may depend on the configuration of the link established on the DSCH, in particular:
the size of the buffer memory areas $25_1$ (one or two blocks) makes it possible to favour either the transmission time (FIGS. 5–8, 11) or the guarantee of reception (FIGS. 9–10);
the number of states of the uplink indication (3 or 4) makes it possible to favour either the bandwidth on the uplink DPCCH (FIG. 9) or the transmission time (FIG. 10).

Advantageously, these parameters may be fixed by the RRC stage during a phase of configuring a link between the node B and the UE, when establishing or reconfiguring the DSCH.

The size of the buffer memories is a configuration parameter for the restarting of the transmission of the blocks by the node B. It is supplied by the RRC module 15A to the module 23 which manages the memory and controls the transmission. It need not be supplied to the UE.

On the other hand, the number of states of the uplink indication retained by the RRC layer must be supplied to the HARQ modules 20A, 20B of the node B and of the UE.

We claim:
1. A method of transmitting data, comprising the steps of:
transmitting successively on a channel, from a first unit, data blocks destined for a second unit;
for at least some of the transmitted data blocks, returning an acknowledgement signal from the second unit to the first unit, indicating whether said transmitted data block has been correctly received;
transmitting on said channel, from the first unit, a redundancy block relating to at least some of the data blocks previously transmitted for which a received acknowledgement signal indicates incorrect reception, whereby each transmitted block is accompanied by an identification signal indicating whether said block is a redundancy block;
associating, in the first unit, each received acknowledgement signal with a block transmitted in a determined temporal relation with the reception of said acknowledgement signal; and
in at least some of the cases of reception of an identification signal inconsistent with an acknowledgement signal previously returned, returning from the second unit to the first unit a restart command signal for restarting transmission of blocks.

2. A method according to claim 1, wherein the blocks are transmitted in turn over K subchannels, the first unit comprising K buffer memories for temporarily storing the data blocks respectively transmitted over the K subchannels, K being a number at least equal to 1 determined in such a way that the acknowledgement signal relating to a data block transmitted over one of the K subchannels is received before the transmission of the next block over said subchannel, said next block being a redundancy block with regard to said data block transmitted in at least some of the cases where the acknowledgement signal received indicates incorrect reception.

3. A method according to claim 1, further comprising the step of:
in response to the reception of the restart command signal subsequent to the reception by the second unit of an identification signal inconsistent with the acknowledgement signal returned with regard to a first data block, restarting, in the first unit, the transmission of successive blocks from a data block following said first data block.

4. A method according to claim 3, wherein the blocks are transmitted in turn over K subchannels, the first unit comprising K buffer memories for temporarily storing the data blocks acknowledgement signal returned with regard to said first data block respectively transmitted over the K subchannels, K being a number at least equal to 1 determined in such a way that the acknowledgement signal relating to a data block transmitted over one of the K subchannels is received before the transmission of the next block over said subchannel, said next block being a redundancy block with regard to said data block transmitted in at least some of the cases where the acknowledgement signal received indicates incorrect reception,
wherein each of the K buffer memories is dimensioned to contain a single data block,
and wherein the data block from which the first unit restarts the transmission in response to the reception of a restart command signal subsequent to the reception by the second unit of an identification signal inconsistent with the acknowledgement signal returned with regard to a first data block transmitted over one of the K subchannels is the last data block transmitted over said channel, obtained from the buffer memory corresponding to said subchannel.

5. A method according to claim 1, further comprising the step of:
in response to the reception of a restart command signal subsequent to the reception by the second unit of an identification signal inconsistent with the acknowledgement signal returned with regard to a first data block, restarting, in the first unit, the transmission of successive blocks from said first data block.

6. A method according to claim 5, wherein the blocks are transmitted in turn over K subchannels, the first unit comprising K buffer memories for temporarily storing the data blocks respectively transmitted over the K subchannels, K being a number at least equal to 1 determined in such a way that the acknowledgement signal relating to a data block transmitted over one of the K subchannels is received before the transmission of the next block over said subchannel, said next block being a redundancy block with regard to said data block transmitted in at least some of the cases where the acknowledgement signal received indicates incorrect reception,
and wherein each of the K buffer memories is dimensioned to contain two data blocks transmitted successively over a subchannel.

7. A method according to claim 1, further comprising the steps of: configuring a link between the first and second units, whereby at least one restart configuration parameter for the transmission of the blocks is supplied to a command module for the transmission of the blocks of the first unit; and
restarting, in the first unit, the transmission of the successive blocks from a data block selected as a function of said restart configuration parameter, in response to the reception of a restart command signal subsequent to the reception by the second unit of an identification signal inconsistent with the acknowledgement signal returned with regard to a first data block.

8. A method according to claim 7, wherein the blocks are transmitted in turn over K subchannels, the first unit comprising K buffer memories for temporarily storing the data blocks respectively transmitted over the K subchannels, K being a number at least equal to 1 determined in such a way that the acknowledgement signal relating to a data block transmitted over one of the K subchannels is received before the transmission of the next block over said subchannel, said next block being a redundancy block with regard to said data block transmitted in at least some of the cases where the acknowledgement signal received indicates incorrect reception,
wherein said data block from which the first unit restarts the transmission in response to the reception of a restart command signal subsequent to the reception by the second unit of an identification signal inconsistent with the acknowledgement signal returned with regard to a first data block transmitted over one of the K subchannels is obtained from the buffer memory corresponding to said subchannel as being, as a function of the restart configuration parameter, either said first data block or the last data block transmitted over said subchannel.

9. A method according to claim 1, further comprising the step of:
returning to the first unit, from the second unit, a restart command signal for restarting transmission of blocks, in each case of reception of an identification signal inconsistent with an acknowledgement signal previously returned.

10. A method according to claim 1, wherein the acknowledgement signal and restart command signal are defined by states of an uplink indication addressed by the second unit to the first unit on a control channel.

11. A method according to claim 10, wherein said uplink indication comprises three states, namely positive acknowledgement, negative acknowledgement and restart command.

12. A method according to claim 10, wherein said uplink indication comprises four states, namely positive acknowledgement with no restart command, negative acknowledgement with no restart command, positive acknowledgement with restart command and negative acknowledgement with restart command.

13. A method according to claim 12, further comprising the step of:
restarting, in the first unit, the transmission of the successive blocks from a data block dependent on the type of acknowledgement, in response to the reception of an uplink indication in a state with restart command.

14. A method according to claim 10, further comprising the step of:

configuring a link between the first and second units, in the course of which at least one format parameter for the restart command signals is supplied to the first and second units, and wherein said uplink indication has a number of states dependent on said format parameter.

15. A device for transmitting data, comprising:

means for transmitting successive data blocks destined for a remote unit; and means for receiving an acknowledgement signal returned by the remote unit and indicating whether a transmitted data block has been correctly received, wherein the means for transmitting blocks are arranged to transmit a redundancy block relating to at least some of the blocks previously transmitted for which the acknowledgement signal received indicates incorrect reception, wherein each acknowledgement signal received is associated with a block transmitted in a determined temporal relation with the reception of said acknowledgement signal, the device further comprising means for transmitting an identification signal accompanying each block transmitted and indicating whether said block is a redundancy block, wherein the means for transmitting blocks are arranged to restart the transmission of blocks in response to the reception of a restart command signal originating from the remote unit and indicating an inconsistency between an identification signal received and an acknowledgement signal previously returned by the remote unit.

16. A device for transmitting data according to claim 15, wherein the means for transmitting blocks are arranged to transmit the blocks in turn over K subchannels, and comprise K buffer memories for temporarily storing the data blocks respectively transmitted over the K subchannels, K being a number at least equal to 1 determined in such a way that the acknowledgement signal relating to a data block transmitted over one of the K subchannels is received before the transmission of the next block over said subchannel, said next block being a redundancy block with regard to said data block transmitted in at least some of the cases where the acknowledgement signal received indicates incorrect reception.

17. A device for transmitting data according to claim 15, wherein the means for transmitting blocks are arranged to restart the transmission of blocks from a data block following a first data block in response to the reception of a restart command signal indicating an inconsistency between an identification signal received and an acknowledgement signal previously returned by the remote unit with regard to said first data block.

18. A device for transmitting data according to claim 17, wherein the means for transmitting blocks are arranged to transmit the blocks in turn over K subchannels, and comprise K buffer memories for temporarily storing the data blocks respectively transmitted over the K subchannels, K being a number at least equal to 1 determined in such a way that the acknowledgement signal relating to a data block transmitted over one of the K subchannels is received before the transmission of the next block over said subchannel, said next block being a redundancy block with regard to said data block transmitted in at least some of the cases where the acknowledgement signal received indicates incorrect reception, and wherein each of the K buffer memories is dimensioned to contain a single data block, and wherein the data block from which the means for transmitting blocks restart the transmission in response to the reception of said restart command signal is the last data block transmitted over the same subchannel as said first block, obtained from the buffer memory corresponding to said subchannel.

19. A device for transmitting data according to claim 15, wherein the means for transmitting blocks are arranged to restart the transmission of blocks from a first data block in response to the reception of a restart command signal indicating an inconsistency between an identification signal received and an acknowledgement signal previously returned by the remote unit with regard to said first data block.

20. A device for transmitting data according to claim 19, wherein the means for transmitting blocks are arranged to transmit the blocks in turn over K subchannels, and comprise K buffer memories for temporarily storing the data blocks respectively transmitted over the K subchannels, K being a number at least equal to 1 determined in such a way that the acknowledgement signal relating to a data block transmitted over one of the K subchannels is received before the transmission of the next block over said subchannel, said next block being a redundancy block with regard to said data block transmitted in at least some of the cases where the acknowledgement signal received indicates incorrect reception, and wherein each one of the K buffer memories is dimensioned to contain two data blocks transmitted successively over a subchannel.

21. A device for transmitting data according to claim 15, wherein the restart command signal indicating an inconsistency between a received identification signal and an acknowledgement signal previously returned by the remote unit with regard to a data block further indicates whether the block accompanied by said identification signal has been correctly received, and wherein the means for transmitting blocks are arranged to restart the transmission of blocks from a first data block in response to the reception of said restart command signal, said first data block being selected in a manner dependent on the fact that the restart command signal indicates or not that the block accompanied by said identification signal has been correctly received.

22. A device for receiving data in the form of data blocks successively transmitted by a remote unit on a channel, comprising means for receiving an identification signal accompanying each block transmitted and indicating whether said block transmitted is a redundancy block, and means for transmitting an acknowledgement signal returned to the remote unit and indicating whether a transmitted data block has been correctly received, a redundancy block being transmitted by the remote unit with regard to each block previously transmitted for which the acknowledgement signal received indicates incorrect reception, the device further comprising means for transmitting a restart command signal for the transmission of blocks which is returned to the remote unit in at least some of the cases of reception of an identification signal inconsistent with an acknowledgement signal previously returned to the remote unit.

23. A device for receiving data according to claim 22, wherein the means for transmitting the restart command signal are arranged to return to the remote unit a restart command signal for the transmission of the blocks in each case of reception of an identification signal inconsistent with an acknowledgement signal previously returned.

24. A device for receiving data according to claim 22, wherein the acknowledgement signal and restart command signal are defined by states of an uplink indication returned to the remote unit via a control channel.

25. A device for receiving data according to claim 24, wherein said uplink indication comprises three states, namely positive acknowledgement, negative acknowledgement and restart command.

26. A device for receiving data according to claim 24, wherein said uplink indication comprises four states, namely positive acknowledgement with no restart command, negative acknowledgement with no restart command, positive acknowledgement with restart command and negative acknowledgement with restart command.

27. A device for receiving data according to claim 22, further comprising means for decoding each block received accompanied by an identification signal inconsistent with an acknowledgement signal previously returned, the means for transmitting the restart command signal being arranged to return to the remote unit a restart command signal for the transmission of the blocks further indicating whether said block has been correctly received on completion of the decoding.

28. A device for receiving data according to claim 22, further comprising means for decoding each block received accompanied by an identification signal inconsistent with an acknowledgement signal previously returned, the transmission means being arranged to return to the remote unit an acknowledgement signal indicating that the data block transmitted has been correctly received without returning any restart command signal when said block has been correctly received on completion of the decoding.

* * * * *

UNITED STATES PATENT AND TRADEMARK OFFICE
CERTIFICATE OF CORRECTION

PATENT NO. : 7,079,489 B2 Page 1 of 1
APPLICATION NO. : 10/046527
DATED : July 18, 2006
INVENTOR(S) : Basien Massie et al.

It is certified that error appears in the above-identified patent and that said Letters Patent is hereby corrected as shown below:

Column 13:
Lines 27 and 28, delete "acknowledgement signal returned with regard to said first data block".

Signed and Sealed this

Seventh Day of November, 2006

JON W. DUDAS
*Director of the United States Patent and Trademark Office*